United States Patent [19]
Sink

[11] 3,895,825
[45] July 22, 1975

[54] EXERCISE CYCLE

[76] Inventor: Robert L. Sink, c/o J & R Manufacturing Co., 10 N. Edmondson, Indianapolis, Ind. 46219

[22] Filed: Feb. 6, 1974

[21] Appl. No.: 440,071

[52] U.S. Cl. ............................. 280/234; 280/255
[51] Int. Cl. ............................................. B62m 1/12
[58] Field of Search ........................... 280/234, 255

[56] References Cited
UNITED STATES PATENTS

| | | | |
|---|---|---|---|
| 608,350 | 8/1898 | Stockford | 280/234 |
| 614,320 | 11/1898 | Dennison | 280/234 |
| 697,104 | 4/1902 | Pietsch | 280/234 |
| 1,688,024 | 10/1928 | Scholer | 280/255 |
| 2,198,717 | 4/1940 | Bottos | 280/234 |

FOREIGN PATENTS OR APPLICATIONS

| | | | |
|---|---|---|---|
| 6,072 | 5/1897 | Norway | 280/255 |
| 425,688 | 10/1947 | Italy | 280/234 |

Primary Examiner—Leo Friaglia
Attorney, Agent, or Firm—Jenkins, Hanley & Coffey

[57] ABSTRACT

An exercise cycle having front and rear wheels rotatably mounted on a rigid frame. Propulsion for the cycle is provided by a driving column which is mounted on the frame for forced oscillatory movement in the plane thereof by a rider. The oscillatory movement is converted to rotational motion by a one-way clutch which is connected to drive the rear wheel. A handle bar is rotatably mounted on the driving column and is coupled to the front wheel by a steering mechanism that functions independently of the oscillatory motion of the driving column.

19 Claims, 8 Drawing Figures

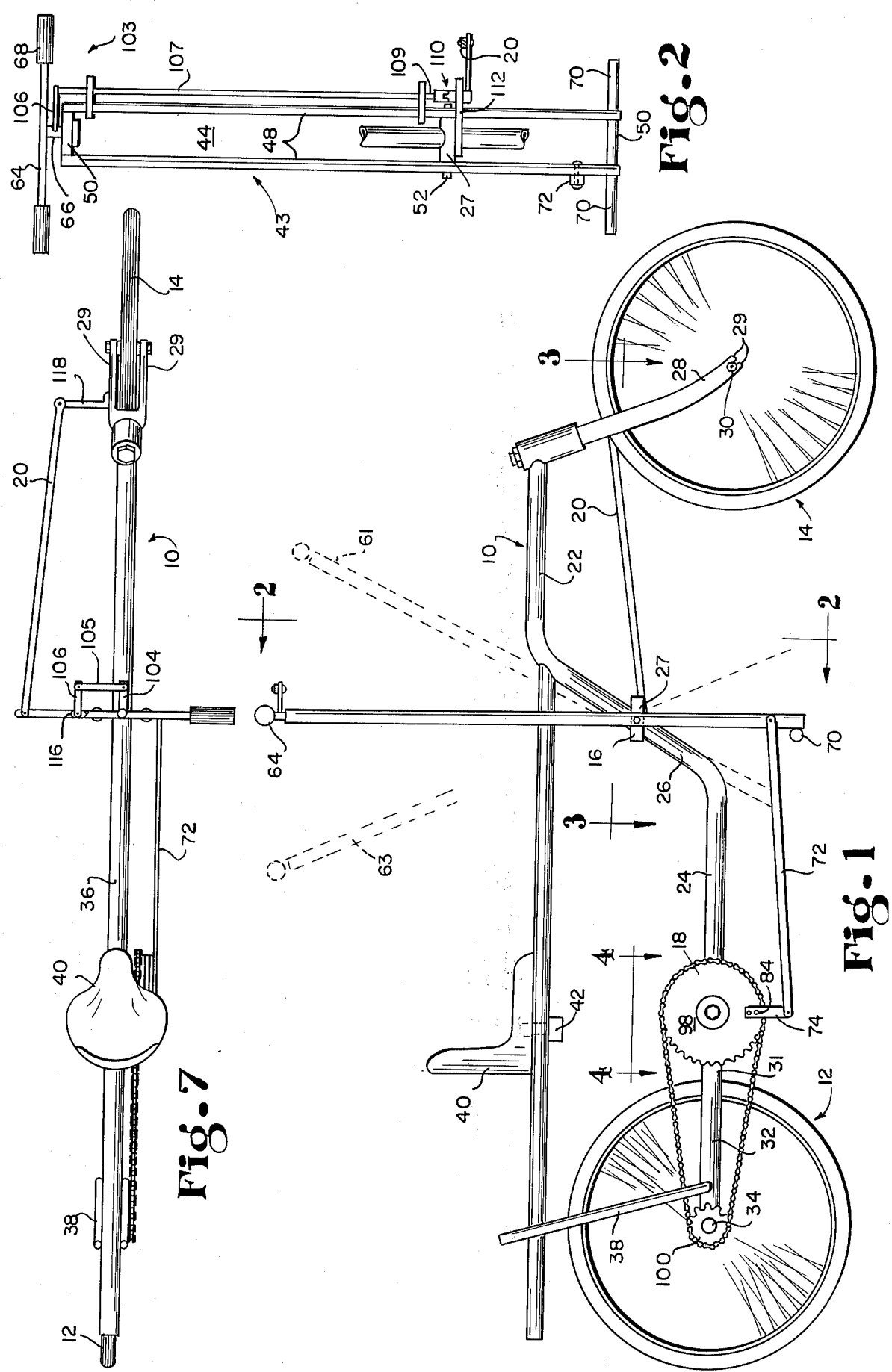

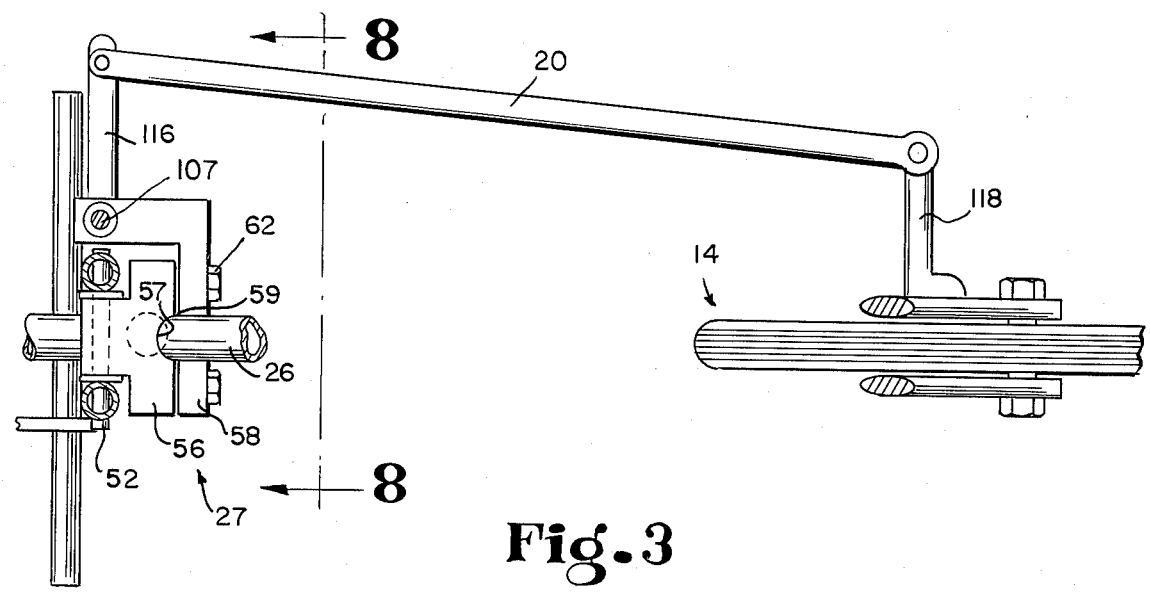
Fig. 3
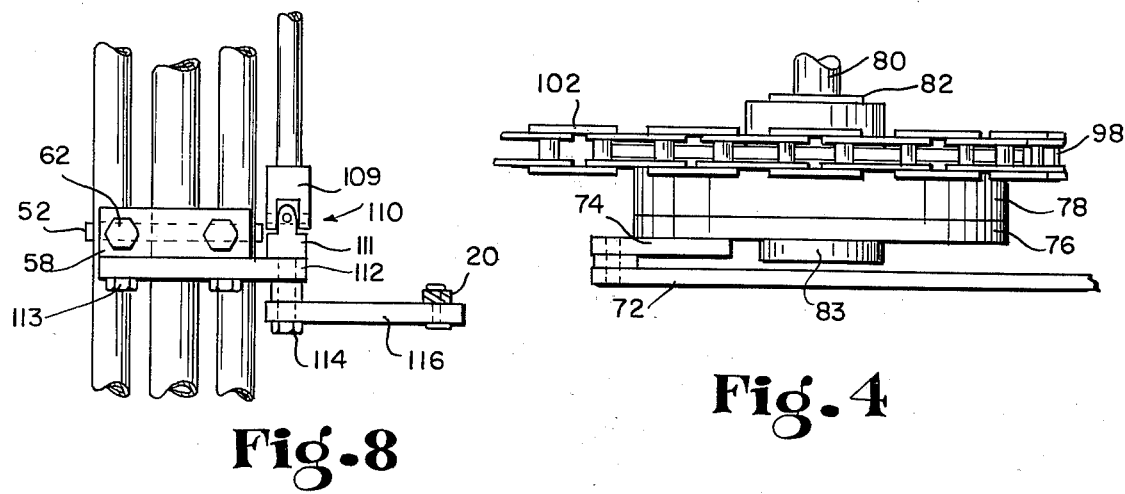
Fig. 8
Fig. 4
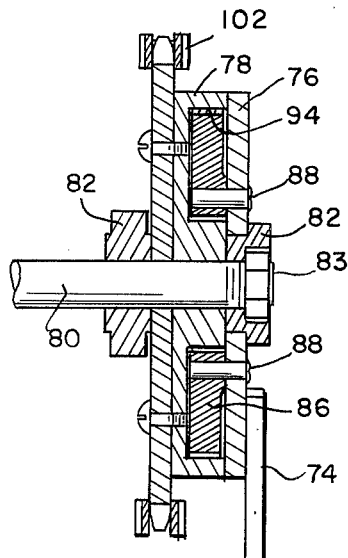
Fig. 5
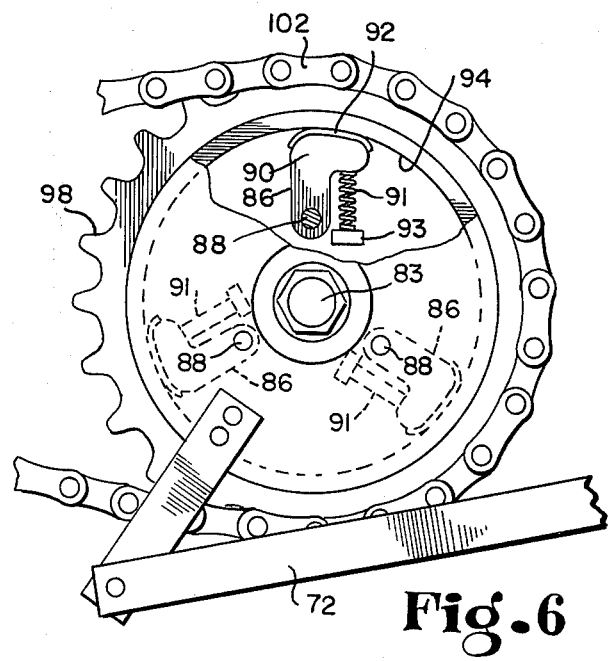
Fig. 6

EXERCISE CYCLE

BACKGROUND OF THE INVENTION

This invention relates to an improved exercise cycle which is powered by the united effort of the arm, leg, and trunk muscles of the operator.

The prior art encompasses a wide variety of man-powered bicycles, tricycles, and the like. While man-powdered cycles do provide a means of transportation, they also serve to exercise a variety of the operator's muscles. The majority of man-powered cycles now available are designed to exercise either the operator's shoulders and arms, or his legs, but not all three. The most common example of a leg-powered cycle is the conventional pedal-operated bicycle, while a typical hand-powered device normally includes a crank which is manually rotated by the operator to provide the required driving force. Such a hand-powered cycle is shown, for example, by Clark, U.S. Pat. No. 506,626.

These foot or hand-powered cycles only provide adequate exercise for one portion of the operator's anatomy. An additional drawback encountered with the hand-powered cycles is that they typically require separate and independent structures to steer the cycle, making it difficult to safely operate the driving and steering mechanisms simultaneously.

A number of cycles have been developed which combine the driving and steering machanisms to permit the cycle to be more easily controlled. See, for example, Clark, U.S. Pat. No. 516,786. This cycle utilizes a hand-operated driving lever which is moved back and forth about a pivot to provide driving force for the cycle. The driving lever is also rotatable about its own axis to provide turning motion to the steering wheel of the cycle. This type of cycle is limited to driving levers disposed wholly above the steering wheel of the cycle and, if the operator's feet are to be used to help oscillate the lever, his feet must also be positioned above the steering wheel. This places the operator in an awkward position with his hands and feet high above ground to make control of the cycle difficult. Moreover, if the lever is oscillated and rotated simultaneously to drive the cycle while turning, the lever necessarily moves back and forth in a crossing motion through the longitudinal plane of the cycle. Such crossing motion continually shifts the weight of the operator, making safe control of the cycle extremely difficult.

The present invention overcomes the disadvantages and difficulties encountered in the prior art by providing an exercise cycle having a hand and foot-operated oscillatory driving column to provide rigorous exercise for various portions of the operator's anatomy, and which permits the operator's feet to be disposed in a stable position near the ground at all times. Furthermore, the cycle can be steered as the driving column is simultaneously and safely oscillated since the oscillations are always in the longitudinal plane of the cycle.

SUMMARY OF THE INVENTION

In accordance with this invention, an exercise cycle is provided having a frame with a seat, a front steering wheel, and a rear driving wheel appropriately mounted thereon. A driving column is pivotally mounted intermediate its length to the frame for oscillatory movement in the general longitudinal plane of the frame by an operator sitting in the seat. A handle bar and foot-rests are mounted on the column for use by the rider in generating the oscillatory movement.

The driving column is connected through a driving link to a one-way clutch which converts the oscillatory motion of the column to rotational motion for unidirectionally driving the rear wheel to which the clutch is also coupled. The clutch has a clutch plate coupled to the driving link and a clutch housing coupled to the rear wheel. A plurality of spring-loaded pawls are mounted on the inside face of the clutch plate to fully and frictionally engage a drum face formed on the clutch housing when the clutch plate is rotated in a forward direction by the driving column movement. However, when the driving column is held stationary for coasting or is not moved in the proper direction, the clutch plate is effectively rotated in a reverse direction relative to the clutch housing. The spring-loaded pawls then only partially engage the drum face of the housing to permit the clutch to freely slip while still maintaining a small drag force on the clutch plate. The drag force tends to carry the clutch plate in a forward direction to eliminate dead center linkage configurations, and further tends to move the driving column in the direction necessary to obtain full engagement of the clutch pawls. This tendency of movement by the driving column thereby serves as an indication to the operator of the direction he must move the column for a propelling stroke after coasting for a period.

The handle bar is rotatably mounted on and with respect to the driving column and is coupled to a steering rod mounted alongside the column so that rotational motion of the handle bar about the central axis of the column is effective to rotate the steering rod. A universal joint is mounted on the steering rod and has its pivot point disposed along the same general horizontal axis about which the driving column oscillates. The universal joint is coupled through linkages to the front wheel to transmit the rotational motion of said steering rod to the front wheel, regardless of the angular relationship between the steering rod and the linkages.

BRIEF DESCRIPTION OF THE DRAWINGS

The accompanying drawings illustrate the invention. In such drawings:

FIG. 1 is a side elevation view of an exercise cycle embodying the invention;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 1;

FIG. 5 is a cross-sectional end view of the one-way clutch;

FIG. 6 is a side view, in partial section, of the clutch shown in FIG. 5;

FIG. 7 is a top plan view of the cycle; and

FIG. 8 is a sectional view taken along the line 8—8 of FIG. 3.

DETAILED DESCRIPTION OF THE PREFERRED EMBODIMENT

An exercise cycle of this invention is shown in FIG. 1 and generally comprises a frame 10 on which a rear driving wheel 12 and a front steering wheel 14 are rotatably mounted. A driving and steering assembly 16 is pivotally mounted on the frame 10 and is independently coupled to the rear wheel 12 through a one-way clutch 18, and to the front steering wheel 14 through a steering bar 20.

The frame 10 is formed of metal bicycle tubing or the like and includes a front bar 22 and a rear bar 24 interconnected by a sloping center bar 26 on which the driving and steering assembly is mounted by a pivot clamping block 27. The front bar 22 is generally horizontal and is disposed above the front wheel 14. A front wheel fork 28 is pivotally coupled to the forward end of the front bar 22 by a typical bearing assembly (not shown). The front wheel 14 has an axle 30 which is rotatably mounted, as by bearings, between the tines 29 of the fork 28 near the lower ends thereof as shown best in FIG. 3.

The rear bar 24 of the cycle frame 10 is also generally horizontal but is disposed below and to the rear of the front bar 22. The rearward end 31 of the rear stretch 24 is rigidly connected to a rear wheel fork 32 which extends rearwardly therefrom in the general plane of the rear stretch 24. The rear driving wheel 12 has an axle 34 which is rotatably coupled, as by bearings, between the tines of the fork 32 near the rearward end thereof to permit free rotation of the wheel.

A seat bar 36 is rigidly mounted on the frame 10 and extends horizontally and rearwardly from the front bar 22. As shown in FIG. 1, the rear portion of the seat bar 36 is supported above the rear wheel 12 by a support yoke 38 which is secured between the seat bar 36 and the rear wheel fork 32. A seat 40 is secured on the seat bar 36 as by a clamp 42 and is positioned on the bar to the rear of the driving and steering assembly 16. The position of the clamp 42 can be adjustably altered to permit the operator to selectively vary the distance between the seat 40 and the driving and steering assembly 16.

As shown in FIG. 2, the driving and steering assembly 16 has a driving column 43 which is comprised of a driving yoke 44 which is pivotally mounted to the center bar 26 of the frame 10 by the pivot clamping block 27. the The 44 is formed of a pair of generally parallel bars 48 which are maintained in spaced relation by spacers 50 that are connected between the bars 48 at their ends. The bars 48 are each pivotally coupled intermediate their lengths to opposite ends of a spindle 52 which is contained in and supported by the pivot clamping block 27.

More specifically, as best shown in FIG. 3, the clamping block 27 is comprised of two block halves 56 and 58, each having a semi-circular slot 57 and 59 therein, for mutually receiving the center bar 26 of the frame 10 at a point intermediate the length of the center bar. Bolts 62 are used to tightly clamp the block halves 56 and 58 together. The spindle 52 is carried in the first block half 56 of the clamp 27 and is free to rotate about its axis with respect to the clamp 27. The spindle 52 is orthogonally disposed to the frame 10, thereby permitting the yoke bars 48 to be freely oscillated about the spindle 52 in close parallel relationship to the front, center, and seat bars 22, 26, and 36. The amplitude of the preferred forward and rearward oscillation of the yoke bars 48 is shown by dotted line positions 61 and 63 in FIG. 1.

A horizontally disposed handle bar 64 is secured to a short bar 66 which is rotatably mounted in the upper yoke bar spacer 50 to permit free rotation of the handle bar 64 with respect to the driving yoke 44 for reasons which will hereafter become more apparent. Conveniently, soft rubber hand grips 68 or the like are mounted over each end of the handle bar 64.

Footrests 70 are mounted at the lower ends of the yoke bars 48 and extend outwardly from each side of the driving yoke 44 in the general plane of the yoke. If desired, the footrests 70 and the lower spacer 50 can be unitarily formed of a single metal bar which is fixed to the bottom ends of the yoke bars 48 and can be adjusted up and down for rider comfort and reach.

The handle bar 64 and the footrests 70 are provided to apply oscillatory movements to the driving column 43 about the spindle 52 in the plane of the frame 10. By grasping the handle bar 64 and by engaging the footrests 70, an operator can, with a combined pushing and pulling action of his arms, legs, and trunk muscles, move the column 43 back and forth.

As shown in FIG. 1, a driving link 72 is pivotally coupled to one of the yoke bars 48 near the lower end of the driving column 43. The opposite end of the driving link 72 is pivotally coupled to one end of a crank link 74 which is fixedly mounted to the one-way clutch 18. The oscillatory movement of the driving column 43 is transmitted by the driving link 72 and the crank link 74 to the clutch 18 which converts the back and forth motion of the column into rotational motion. The relative lengths of the driving link 72 and the crank link 74 affect the stroke distance of the oscillatory movement of the yoke 44. Desirably, the link lengths are chosen so that neither link comes unduly close to the ground and so that the driving yoke 44 can be oscillated through an angle of approximately 30°. Also, if desired, the crank link 74 can have a series of holes 84 spaced along its length to which the driving link can be selectively coupled to alter the driving torque required to rotate the clutch 18.

The one-way clutch 18 generally comprises a clutch plate 76 and a clutch housing 78. As shown in FIGS. 4–6, both the clutch plate 76 and the clutch housing 78 are rotatably mounted on a spindle 80 which is journaled in suitable bearings 82 mounted on the rear bar 24 of the frame 10. The plate 76 and housing 78 are freely rotatable on the spindle 80 with respect to the frame 10, and are retained on said spindle by a hub 83. The crank link 74 is fixedly coupled to the outside face of the clutch plate 76 to transmit the oscillatory motion of the driving yoke 44 to the plate. Self-engaging pawls 86 are mounted on the inside face of the clutch plate 76 and are adapted to frictionally engage an inner drum face 94 of the clutch housing to drive the housing 78 along with the plate 76.

More specifically, and as shown in FIG. 6, three generally L-shaped pawls 86 are pivotally mounted on the inside face of the clutch plate 76 by pins 88 extending through the radially inward portions of the pawls. The pawls 86 each have smooth rounded corners, and are disposed in equally spaced arcuate relation about the clutch plate 76. The foot portion 90 of each pawl 86 is generally rounded to correspond to the circular inner drum face 94 formed on the inside face of the clutch housing 78. A suitable friction facing 92 is bonded to the drum contacting surface of each foot 90 to enhance frictional engagement between the pawls 86 and the drum face 94.

Clockwise rotation of the clutch plate 76 by the driving link 72 is effective to cause full, immediate engagement between the pawl feet 90 and the clutch housing drum face 94 which accordingly drives the housing. If, on the other hand, the driving column 43 is held stationary or is oscillated so as to cause a counterclockwise rotation of the clutch plate 76, the full driving engagement of the pawl feet 90 is eliminated. However, springs 91 are coupled between the foot 90 of each pawl 86 and respective flanges 93 protruding from the face of the clutch plate 76. Each spring 91 is in a partially compressed state to thereby urge its associated pawl 86 to rotate counterclockwise, as viewed in FIG. 6, about its respective pivot pin 88 and into continual, partial engagement with the drum face 94 of the clutch housing 78 when the clutch plate is held stationary or is rotated in a counterclockwise direction. Viewed differently, the partial engagement between the pawls 86 and the drum face 94 due to the springs 91 creates forces sufficient to cause the pawls 86 to rotate clockwise about their respective pivot pins 88 as shown in FIG. 6. This compresses the springs 91 to reduce the surface contact between the pawls and the drum face and thereby permits the clutch plate 76 to freewheel in the counterclockwise direction.

As previously mentioned, when the clutch plate 76 is driven in a clockwise direction, the pawls 86 engage the drum face 94 of the clutch housing 78 to also drive the clutch housing 78 in a clockwise direction. A large sprocket wheel 98 is fixedly mounted as by bolts 99 to the outside face of the clutch housing 78, and rotates in a clockwise direction whenever the clutch housing is so driven. As shown best in FIg. 1, a small sprocket wheel 100 is coupled to the rear axle 34 of the cycle, and rotational motion of the large sprocket wheel 98 is transmitted to the small sprocket wheel 100 by a bicycle chain 102 interconnecting the two sprocket wheels. The rear wheel 12 of the cycle is thereby driven in a clockwise, or forward, direction whenever the clutch housing 78 is similarly driven.

During operation, the exercise cycle is propelled as the operator utilizes his arm, leg, and trunk muscles to push and pull the driving yoke 44 through an oscillatory motion about the axis of the spindle 52. As previously described, this oscillatory motion is transmitted through the driving link 72 to the clutch plate 76 to thereby rotationally drive the clutch plate. Whether the clutch plate 76 is driven in a clockwise or a counterclockwise direction depends primarily upon the direction in which the driving yoke 44 is first moved. For example, if the yoke 44 is inadvertently moved initially in a direction to cause counterclockwise rotation, and thus freewheeling, of the clutch plate 76, then the operator can correct the problem simply by reversing the direction of yoke movement in the middle of a stroke. This causes the links 72 and 74 to reverse the direction of rotation of the clutch plate and housing to drive the cycle. Whenever, at anytime during operation, the direction of yoke movement is reversed in the middle of a stroke, the direction of clutch plate rotation will be reversed. That is, the operator must move the yoke completely to the end of each stroke, or the direction of rotation of the clutch plate will be reversed. Therefore, as the cycle is ridden, power stroking with the yoke 44 can be started and stopped as desired, but to resume power stroking the operator must move the yoke in the correct direction to properly rotate the clutch plate. If he moves the yoke in the incorrect direction, the clutch will simply freewheel and indicate to the operator that he must reverse yoke movement in the middle of a stroke to again propel the cycle.

Whenever the cycle is moving but the operator has temporarily stopped power stroking in order to coast, the clutch housing 78 will continue to rotate along with the rear wheel 12. Since the yoke 44 is being held stationary by the operator, the clutch plate 76 will also be maintained in a stationary state. In this situation, the clutch plate 76 kinematically experiences a counterclockwise rotation with respect to the clutch housing 78, and therefore the clutch will override or freewheel as previously described during coasting. The action of the springs 91 on the pawls 86, however, serves to maintain the pawls 86 in at least a partial state of engagement with the drum face 94 of the clutch housing 78 at all times, regardless of rotational direction. Because of this partial engagement, the motion of the rotating clutch housing 78 during coasting creates a dragging force on the clutch plate 76 which causes the plate 76 to rotate slowly and the yoke 44 to continue oscillating slowly unless the operator holds the yoke 44 stationary. In this manner, the dragging force serves to gently pull on the yoke 44 to indicate to the operator the proper direction the yoke should be moved to continue power stroking.

The dragging force also serves to carry the driving link 72 and the crank link 74 past the 0° and 180° configurations where they might otherwise deadlock and prevent rotational driving of the clutch in any direction. For example, upon resumption of power stroking after coasting, the dragging force rotates the links 72 and 74 past a possible dead center position as soon as the operator momentarily releases the yoke 44 from a stationary position before again moving the yoke in a direction to drive the cycle. In the event that the cycle is stopped with the links 72 and 74 in a dead center position, the operator can alleviate the problem simply by manually pushing the cycle forward to start rotating the rear wheel. Such rotation imparts a dragging force on the clutch plate 76 to carry the links past dead center, as well as to gently pull the yoke 44 in the direction in which it should be moved to drive the cycle.

Steering of the exercise cycle is accomplished through linkages 103 mounted alongside the driving yoke 44. As previously mentioned with reference to FIG. 2, the handle bar 64 is mounted to a bar 66 which is rotatably secured to the top of the driving yoke 44. As shown in FIGS. 2 and 7, a rotator link 104 has one end fixed to the short bar 66 and extends outwardly therefrom. A second and offset rotator link 105 is pivotally connected between the extended end of the first link 104 and an end of a third rotator link 106. The other end of the third link is fixed to the top of a steering rod 107. This linkage is effective to transmit rotation of the handle bar 64 successively through the links 104, 105, and 106 to rotate the steering rod 107. The lower end of the steering rod 107 terminates in the upper portion 109 of a universal joint 110. As shown in detail in FIG. 8, the universal joint 110 is supported in position by a bracket 112 which is secured by bolts 113 to the second half 58 of the pivot clamping block 27. The bracket 112 serves to position the universal joint 110 so that the pivot axis of the joint 110 is always disposed along the same general horizontal axis as that of the driving column spindle 52.

The lower portion 111 of the universal joint 110 extends through the bracket 112 and is fixedly coupled as by a clamping bolt 114 to a steering offset link 116. As shown in FIG. 3, the offset link 116 extends laterally outwardly from the frame and is pivotally coupled at its other end to one end of the steering bar 20. The other end of the steering bar 20 is pivotally coupled to a fork offset link 118 which is secured to one tine of the front wheel fork 28 toward the outer radius of the front wheel 14. The fork link 118 extends laterally outwardly from the fork 28 in general parallel relationship to the steering offset link 116.

The direction of movement of the cycle is controlled by the relative rotational position of the handle bar 64. When the handle bar 64 is rotated with respect to the driving yoke 44, the rotator link 104 turns along with the handle bar 64 and acts through the second and third links 105 and 106 to rotate the steering rod 107 about its own axis. The steering rod rotation is transmitted through the universal joint to the steering offset link 116, which, in turn, acts through the steering bar 20 and the fork offset link 118, to impart the rotational motion to the front wheel fork 28 to turn the front wheel.

The lengths of the links 104, 105, and 106 need only be sufficient to effectively transmit the rotational motion of the handle bar 64 to the steering rod 107. However, the lengths of the steering offset links 116 and 118 should be sufficient to maintain a degree of clearance between these links and the wheel 14 during a normal turning motion.

The steering mechanism of this cycle operates totally independently of the driving mechanism, although they are both part of the same assembly 16. The driving yoke 44 is oscillatingly movable about the axis of the spindle 52 in the plane of the frame 10 under forces applied to the handle bar 64 and the footrests 70 by the operator. The yoke 44 cannot be rotated nor can it be moved across or out of the plane of the frame. When the cycle is to be turned to the left or to the right, the handle bar is rotated with respect to the yoke to rotate the rod 107 which is oscillated with the yoke 44. The universal joint 110 permits the turning motion of the handle bar 64 to be transferred from the rod 107 to the steering offset link 116 therebelow, irrespective of the angular relationship between them. Therefore, propulsion of the cycle is accomplished solely through the longitudinal oscillation of the driving yoke 44, and steering is accomplished solely through the rotational movement of the handle bar 64 about the yoke 44. Since the pivot points of the driving yoke 44 and the universal joint 110 are along the same horizontal axis, neither movement affects the other in any way.

Braking can be accomplished through the use of a conventional caliper-type hand brake. While such brakes are not shown in the drawings for purposes of clarity, they can be readily mounted to one or both wheels and controlled by hand grips mounted on the handle bar.

An exercise cycle of this invention is particularly well-suited to develop muscles in the arms, legs, and torso, separately or together in varying combinations. The distance between the seat 40 and the driving assembly 16 can be easily and quickly adjusted to increase or decrease the torso involvement required to drive the cycle. Moreover, the length of the driving stroke and the torque required to drive the cycle can be selectively varied by increasing or decreasing the effective length of the crank link 74.

I claim:

1. An exercise cycle comprising a frame having a seat mounted thereon, and front and rear wheels rotatably mounted at opposed ends thereof, said front wheel being pivotally mounted to said frame to permit steering of the cycle; a driving column pivotally mounted intermediate its length to said frame for oscillatory movement parallel to the plane of said frame; a one-way clutch rotatably mounted on said frame, said clutch having a clutch housing and a clutch plate, said plate having means thereon for operably engaging said housing upon rotation of said plate in a first direction to continuously drive said housing in the same direction, said means on said plate being partially engageable with saidi housing when said plate is stationary and when said plate is rotated in a relative direction opposite said first direction with respect to said housing to cause said housing to impose a dragging force on said plate; a driving link pivotally coupled between said column and said clutch to cause said clutch to rotate in response to oscillatory movement of said column; means coupling said clutch to said rear wheel to transmit rotational motion of said clutch to said rear wheel; a steering rod rotatably mounted to said driving column for rotation about its own axis and for oscillation with said column; a handle bar rotatably mounted to the upper end of said column and coupled to said steering rod for oscillating said column and for rotating said rod in response to oscillatory and rotary forces applied thereto; a universal joint at the lower end of said rod and having its pivot point disposed along the same general axis as the pivot point of said column; and means coupling said universal joint to said front wheel to turn said front wheel in response to rotation of said steering rod.

2. An exercise cycle as set forth in claim 1 wherein a footrest is mounted on said driving column and extends outwardly therefrom.

3. An exercise cycle as set forth in claim 1 wherein said seat is mounted on said frame generally above said rear wheel and to the rear of said driving column.

4. An exercise cycle as set forth in claim 1 wherein said driving link is pivotally coupled to said driving column at a point disposed below the pivot point of said column.

5. An exercise cycle as set forth in claim 1 wherein said frame comprises a generally horizontal front bar disposed above said front wheel and having a steering fork pivotally coupled to the forward end thereof and extending generally forwardly and downwardly therefrom in the plane of the frame, a generally horizontal rear bar disposed below and to the rear of said front stretch and having a second fork coupled to the rearward end thereof and extending rearwardly therefrom, and a center bar interconnected between said front and rear stretches, said driving column being pivotally mounted to said center stretch intermediate the length thereof.

6. An exercise cycle as set forth in claim 5 with the addition of a generally horizontal seat bar coupled to said frame and extending rearwardly from said front bar above said rear wheel, and means connected between said second fork and said seat bar for supporting said seat bar above said rear wheel, said seat being adjustably mounted on said seat bar to the rear of said driving column.

7. An exercise cycle as set forth in claim 5 wherein said means coupling said universal joint to said steering fork comprises a first offset link secured to said universal joint and rotatable therewith and extending outwardly therefrom in a plane generally normal to said steering rod, a second offset link secured to one side of said steering fork and disposed generally parallel to said first offset link, and a steering bar pivotally connected to said first and second offset link.

8. An exercise cycle as set forth in claim 1 wherein said driving column comprises a pair of generally parallel bars mounted intermediate their lengths on a spindle and laterally interconnected by a plurality of spacers, said spindle being mounted in a clamp, and said clamp being fixed to said frame to permit rotation of said bars about the axis of said spindle parallel to the plane of said frame.

9. An exercise cycle as set forth in claim 1 wherein said clutch plate is coupled to said driving link, and said clutch housing is connected to said means coupling said clutch to said rear wheel and has a drum face formed thereon, said means on said clutch plate for engaging said clutch housing comprising a plurality of pawls mounted on one face of said plate and operably engageable with said drum face upon rotation of said clutch plate in a first direction to cause said clutch housing to rotate in said first direction, said pawls being spring-loaded to partially engage said drum face when said clutch plate is rotatably stationary and when said clutch plate is rotated in a relative direction opposite said first direction to cause said clutch housing to impose a dragging force on said clutch plate.

10. An exercise cycle as set forth in claim 9 wherein said means for coupling said clutch housing to said rear wheel comprises a first sprocket wheel secured to said clutch housing and rotatable therewith, a second sprocket wheel secured to said rear wheel and rotatable therewith, and a sprocket chain in mesh with said first and second sprocket wheels to transmit rotational motion of one of said sprocket wheels to the other of said sprocket wheels.

11. An exercise cycle as set forth in claim 1 including a crank link with a plurality of holes disposed along the length thereof, said crank link having one end fixedly mounted to said clutch, and wherein said driving link is pivotally coupled to said crank link at one of said holes.

12. An exercise cycle as set forth in claim 1 wherein said handle bar is coupled to said steering rod by means comprising a first link secured to said handle bar and rotatable therewith and extending outwardly therefrom, a second link pivotally connected to said first link, and a third link secured to said steering rod and pivotally connected to said second link whereby rotation of said handle bar is transmitted through said links to rotate said steering rod.

13. An exercise cycle comprising a frame having a seat mounted thereon and front and rear wheels rotatably mounted at opposed ends thereof, said front wheel being pivotally mounted with respect to said frame for steering of the cycle; a driving column formed of a pair of parallel bars mounted intermediate their lengths on a spindle and connected by a plurality of spacers, said spindle being mounted in a clamp fixed to said frame to permit rotation of said bars about the axis of said spindle parallel to the plane of said frame; a handle bar mounted at the upper end of said column and rotatable about the central axis of said column; a foot bar mounted at the lower end of said column and extending outwardly therefrom; a clutch plate and a clutch housing rotatably mounted on said frame, said clutch housing having a drum face formed thereon, said clutch plate having a plurality of pawls mounted on one face thereof and operably engageable with said drum face upon rotation of said clutch plate in a first direction to cause said housing to rotate in said first direction, said pawls being spring-loaded to partially engage said drum face when said clutch plate is rotatably stationary and when said clutch plate is rotated in a direction opposite said first direction to cause said housing to impose a dragging force on said clutch plate; a driving link pivotally coupled between one of the bars of said driving column and said clutch plate to cause said plate to rotate in response to oscillatory rotation of said column on said spindle; means coupling said clutch housing to said rear wheel to transmit rotational motion of said clutch housing to said rear wheel; a steering rod mounted alongside said driving column for rotation about its own axis and rotatably movable with said column; means coupling said handle bar to said steering rod to rotate said rod in response to rotational movements of said handle bar; a universal joint mounted at the lower end of said steering bar and having its pivot point disposed along the axis of said spindle; and means coupling said universal joint to said front wheel for turning said front wheel in response to rotation of said steering rod.

14. An exercise cycle as set forth in claim 13 wherein said seat is mounted on said frame to the rear of said driving column and said seat is adjustably secured to said frame.

15. An exercise cycle as set forth in claim 13 including a crank link with a plurality of holes disposed along the length thereof, said crank link having one end fixed to said clutch plate, and wherein said driving link is pivotally coupled to said crank link at one of said holes.

16. An exercise cycle as set forth in claim 13 wherein said driving link is pivotally coupled at one end thereof to one of the bars of said driving column at a point below said spindle.

17. An exercise cycle as set forth in claim 1 wherein said steering rod is mounted alongside said driving column for rotation about its own axis and for oscillation with said column.

18. An exercise cycle comprising a frame having a seat mounted thereon, and front and rear wheels rotatably mounted at opposed ends thereof, said front wheel being pivotally mounted to said frame to permit steering of the cycle; a driving column pivotally mounted intermediate its length to said frame for oscillatory movement parallel to the plane of said frame; a one-way clutch rotatably mounted on said frame; a driving link pivotally coupled between said column and said clutch to cause said clutch to rotate in response to oscillatory movement of said column; means coupling said clutch to said rear wheel to transmit rotational motion of said clutch to said rear wheel; a steering rod rotatably mounted to said driving column for rotation about its own axis and for oscillation with said column; a handle bar rotatably mounted to the upper end of said column for oscillating said column, said handle bar being coupled to said steering rod by a first link fixed to said bar and extending outwardly therefrom and pivotally connected to a second link, said second link being pivotally connected to a third link fixed to said steering rod whereby rotation of said handle bar is transmitted through said links to rotate said steering rod; a universal joint at the lower end of said rod and having its pivot point disposed along the same general axis as the pivot point of said column; and means coupling said universal joint to said front wheel to turn said front wheel in response to rotation of said steering rod.

19. An exercise cycle as set forth in claim 18 wherein said steering rod is mounted alongside said driving column for rotation about its own axis and for oscillation with said column.

* * * * *